US007721053B2

(12) United States Patent
Cochran et al.

(10) Patent No.: US 7,721,053 B2
(45) Date of Patent: May 18, 2010

(54) INTELLIGENT LOGICAL UNIT PROVISIONING

(75) Inventors: Robert A. Cochran, Sacramento, CA (US); Jay Schultz, Sacramento, CA (US); Woodson B. Long, Rocklin, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 770 days.

(21) Appl. No.: 11/256,912

(22) Filed: Oct. 24, 2005

(65) Prior Publication Data

US 2007/0094393 A1    Apr. 26, 2007

(51) Int. Cl.
*G06F 12/00* (2006.01)

(52) U.S. Cl. ..................... 711/154; 711/202

(58) Field of Classification Search ............... 711/148, 711/114, 112, 154, 202, 203, 170
See application file for complete search history.

(56) References Cited

U.S. PATENT DOCUMENTS

| 5,923,876 | A | 7/1999 | Teague |
|---|---|---|---|
| 6,161,192 | A | 12/2000 | Lubbers |
| 6,170,063 | B1 | 1/2001 | Golding |
| 6,295,578 | B1 | 9/2001 | Dimitroff |
| 6,397,293 | B2 | 5/2002 | Shrader |
| 6,487,636 | B1 | 11/2002 | Dolphin |
| 6,490,122 | B1 | 12/2002 | Holmquist et al. |
| 6,493,656 | B1 | 12/2002 | Houston |
| 6,505,268 | B1 | 1/2003 | Schultz |
| 6,523,749 | B2 | 2/2003 | Reasoner |
| 6,546,459 | B2 | 4/2003 | Rust |
| 6,560,673 | B2 | 5/2003 | Elliott |
| 6,587,962 | B1 | 7/2003 | Hepner |
| 6,594,745 | B2 | 7/2003 | Grover |
| 6,601,187 | B1 | 7/2003 | Sicola |
| 6,606,690 | B2 | 8/2003 | Padovano |
| 6,609,145 | B1 | 8/2003 | Thompson |
| 6,629,108 | B2 | 9/2003 | Frey |
| 6,629,273 | B1 | 9/2003 | Patterson |
| 6,643,795 | B1 | 11/2003 | Sicola |

(Continued)

FOREIGN PATENT DOCUMENTS

JP    2001350707    12/2001

(Continued)

OTHER PUBLICATIONS

Hillyer, Bruce K. et al, On the Modeling and Performance Characteristics of a Serpentine Tape Drive, AT&T Bell Laboratories, ACM SIGMETRICS International Conference on Measurement and Modeling of Computer Systems, pp. 170-179, 1996.*

*Primary Examiner*—Pierre-Michel Bataille

(57) ABSTRACT

In one embodiment, a storage controller comprises a first I/O port that provides an interface to a host computer, a second I/O port that provides an interface to a storage device, a processor that receives I/O requests generated by the host computer and, in response to the I/O requests, generates and transmits I/O requests to the storage device, and a memory module communicatively connected to the processor. The memory module comprises logic instructions which, when executed by the processor, configure the processor to collect performance data and availability data for a plurality of logical devices (LDEVS) managed by the storage controller, and present the performance data and availability data to a reporting interface.

31 Claims, 4 Drawing Sheets

U.S. PATENT DOCUMENTS

| | | |
|---|---|---|
| 6,647,514 B1 | 11/2003 | Umberger |
| 6,658,590 B1 | 12/2003 | Sicola |
| 6,663,003 B2 | 12/2003 | Johnson |
| 6,681,308 B1 | 1/2004 | Dallmann |
| 6,708,285 B2 | 3/2004 | Oldfield |
| 6,715,101 B2 | 3/2004 | Oldfield |
| 6,718,404 B2 | 4/2004 | Reuter |
| 6,718,434 B2 | 4/2004 | Veitch |
| 6,721,902 B1 | 4/2004 | Cochran |
| 6,725,393 B1 | 4/2004 | Pellegrino |
| 6,742,020 B1 | 5/2004 | Dimitroff |
| 6,745,207 B2 | 6/2004 | Reuter |
| 6,763,409 B1 | 7/2004 | Elliott |
| 6,772,231 B2 | 8/2004 | Reuter |
| 6,775,790 B2 | 8/2004 | Reuter |
| 6,795,904 B1 | 9/2004 | Kamvysselis |
| 6,802,023 B2 | 10/2004 | Oldfield |
| 6,807,605 B2 | 10/2004 | Umberger |
| 6,817,522 B2 | 11/2004 | Brignone |
| 6,823,453 B1 | 11/2004 | Hagerman |
| 6,832,299 B2 * | 12/2004 | Shimada et al. ............. 711/148 |
| 6,839,824 B2 | 1/2005 | Camble |
| 6,842,833 B1 | 1/2005 | Phillips |
| 6,845,403 B2 | 1/2005 | Chadalapaka |
| 7,272,686 B2 * | 9/2007 | Yagisawa et al. ............ 711/114 |
| 2002/0019863 A1 | 2/2002 | Reuter |
| 2002/0019908 A1 | 2/2002 | Reuter |
| 2002/0019920 A1 | 2/2002 | Reuter |
| 2002/0019922 A1 | 2/2002 | Reuter |
| 2002/0019923 A1 | 2/2002 | Reuter |
| 2002/0048284 A1 | 4/2002 | Moulton |
| 2002/0188800 A1 | 12/2002 | Tomaszewski |
| 2003/0051109 A1 | 3/2003 | Cochran |
| 2003/0056038 A1 | 3/2003 | Cochran |
| 2003/0063134 A1 | 4/2003 | Lord |
| 2003/0074492 A1 | 4/2003 | Cochran |
| 2003/0079014 A1 | 4/2003 | Lubbers |
| 2003/0079074 A1 | 4/2003 | Sicola |
| 2003/0079082 A1 | 4/2003 | Sicola |
| 2003/0079083 A1 | 4/2003 | Lubbers |
| 2003/0079102 A1 | 4/2003 | Lubbers |
| 2003/0079156 A1 | 4/2003 | Sicola |
| 2003/0084241 A1 | 5/2003 | Lubbers |
| 2003/0101318 A1 | 5/2003 | Kaga |
| 2003/0110237 A1 | 6/2003 | Kitamura |
| 2003/0126315 A1 | 7/2003 | Tan |
| 2003/0126347 A1 | 7/2003 | Tan |
| 2003/0140191 A1 | 7/2003 | McGowen |
| 2003/0145045 A1 | 7/2003 | Pellegrino |
| 2003/0145130 A1 | 7/2003 | Schultz |
| 2003/0170012 A1 | 9/2003 | Cochran |
| 2003/0177323 A1 | 9/2003 | Popp |
| 2003/0187847 A1 | 10/2003 | Lubbers |
| 2003/0187947 A1 | 10/2003 | Lubbers |
| 2003/0188085 A1 | 10/2003 | Arakawa |
| 2003/0188114 A1 | 10/2003 | Lubbers |
| 2003/0188119 A1 | 10/2003 | Lubbers |
| 2003/0188153 A1 | 10/2003 | Demoff |
| 2003/0188218 A1 | 10/2003 | Lubbers |
| 2003/0188229 A1 | 10/2003 | Lubbers |
| 2003/0188233 A1 | 10/2003 | Lubbers |
| 2003/0191909 A1 | 10/2003 | Asano |
| 2003/0191919 A1 | 10/2003 | Sato |
| 2003/0196023 A1 | 10/2003 | Dickson |
| 2003/0212781 A1 | 11/2003 | Kaneda |
| 2003/0229651 A1 | 12/2003 | Mizuno |
| 2003/0236953 A1 | 12/2003 | Grieff |
| 2004/0019740 A1 | 1/2004 | Nakayama |
| 2004/0022546 A1 | 2/2004 | Cochran |
| 2004/0024838 A1 | 2/2004 | Cochran |
| 2004/0024961 A1 | 2/2004 | Cochran |
| 2004/0030727 A1 | 2/2004 | Armangau |
| 2004/0030846 A1 | 2/2004 | Armangau |
| 2004/0049634 A1 | 3/2004 | Cochran |
| 2004/0078638 A1 | 4/2004 | Cochran |
| 2004/0078641 A1 | 4/2004 | Fleischmann |
| 2004/0128404 A1 | 7/2004 | Cochran |
| 2004/0168034 A1 | 8/2004 | Homma et al. |
| 2004/0215602 A1 | 10/2004 | Cioccarelli |
| 2004/0230859 A1 | 11/2004 | Cochran |
| 2004/0267959 A1 | 12/2004 | Cochran |
| 2005/0044336 A1 * | 2/2005 | Shimada et al. ............. 711/170 |
| 2005/0071596 A1 * | 3/2005 | Aschoff et al. ............. 711/170 |

FOREIGN PATENT DOCUMENTS

| | | |
|---|---|---|
| JP | 2003296290 | 10/2003 |
| JP | 2003345514 | 12/2003 |

* cited by examiner

| CU:LDEV 405 | RAID Type 410 | RAID Group 415 | LDEV Size (GB) 420 | Disk Type/ (RPM) 425 | Internal/ External 430 | OLTP Test 435 | Data Warehouse Test 440 | Minimum Physical Paths to Disks 445 | Minimum Physical Paths to Controller 450 |
|---|---|---|---|---|---|---|---|---|---|
| 02:AB | 5 | 1-2 | 2.3 | 73GB, 15kRPM, FC | int | 750 | 71 | 2 | 2 |
| 02:A8 | 5 | 1-2 | 2.3 | 73GB, 15kRPM, FC | int | 740 | 85 | 2 | 2 |
| 02:A6 | 5 | 1-1 | 2.3 | 73GB, 15kRPM, FC | int | 675 | 80 | 2 | 2 |
| 02:A4 | 5 | 1-1 | 2.3 | 73GB, 15kRPM, FC | int | 650 | 84 | 2 | 2 |
| 02:A5 | 5 | 1-1 | 2.3 | 73GB, 15kRPM, FC | int | 633 | 79 | 2 | 2 |
| 02:A3 | 5 | 1-1 | 2.3 | 73GB, 15kRPM, FC | int | 610 | 79 | 2 | 2 |
| 02:A7 | 5 | 1-1 | 2.3 | 73GB, 15kRPM, FC | int | 590 | 84 | 2 | 2 |
| 02:A2 | 5 | 1-1 | 2.3 | 73GB, 15kRPM, FC | int | 572 | 60 | 2 | 2 |
| 02:A9 | 5 | 1-1 | 2.3 | 73GB, 10kRPM, FC | int | 555 | 59 | 2 | 2 |
| 02:AA | 5 | 1-1 | 2.3 | 73GB, 10kRPM, FC | int | 512 | 60 | 2 | 2 |
| 02:A1 | 5 | 1-1 | 2.3 | 73GB, 10kRPM, FC | int | 505 | 65 | 2 | 2 |
| 02:AC | 1 | 1-1 | 2.3 | 73GB, 10kRPM, FC | int | 466 | 66 | 2 | 2 |
| 02:AD | 1 | 1-1 | 2.3 | 73GB, 10kRPM, FC | int | 423 | 59 | 2 | 2 |
| 02:AE | 1 | na | 2.3 | 36GB, 10kRPM, FC | ext | 420 | 40 | 2 | 2 |
| 02:AF | 1 | na | 2.3 | 73GB, 10kRPM, FC | ext | 388 | 39 | 4 | 2 |
| 02:B0 | 1 | na | 2.3 | 36GB, 10kRPM, SATA | ext | 200 | 20 | 2 | 2 |
| 02:B1 | 1 | na | 2.3 | 73GB, 10kRPM, SATA | ext | 198 | 18 | 1 | 1 |

INTELLIGENT LOGICAL UNIT PROVISIONING

BACKGROUND

The described subject matter relates to data storage in electronic computing, and more particularly to intelligent logical unit provisioning.

Effective collection, management, and control of information have become a central component of modern business processes. To this end, many businesses, both large and small, now implement computer-based information management systems.

Data management is an important component of computer-based information management systems. Many users implement storage networks to manage data operations in computer-based information management systems. Storage networks have evolved in computing power and complexity to provide highly reliable, managed storage solutions that may be distributed across a wide geographic area, and across physical storage devices that are under the management of a storage controller (i.e., internal) or outside the management of a storage controller (i.e., external).

Adroit management of storage network resources contributes to the effective management of storage networks. Existing management interfaces provide limited information for managing storage resources. Management interfaces that provide additional management information would be useful.

SUMMARY

In one embodiment, a storage controller comprises a first I/O port that provides an interface to a host computer, a second I/O port that provides an interface a storage device, a processor that receives I/O requests generated by the host computer and, in response to the I/O requests, generates and transmits I/O requests to the storage device, and a memory module communicatively connected to the processor. The memory module comprises logic instructions which, when executed by the processor, configure the processor to collect performance data and availability data for a plurality of logical devices (LDEVS) managed by the storage controller, and present the performance data and availability data to a reporting interface.

BRIEF DESCRIPTION OF THE DRAWINGS

FIG. 4 is a schematic illustration of one embodiment of a user interface for intelligent logical unit provisioning.

DETAILED DESCRIPTION

Described herein are exemplary systems and methods for intelligent logical unit provisioning in a storage device, array, or network. The methods described herein may be embodied as logic instructions on a computer-readable medium. When executed on a processor such as, e.g., an array controller, the logic instructions cause the processor to be programmed as a special-purpose machine that implements the described methods. The processor, when configured by the logic instructions to execute the methods recited herein, constitutes structure for performing the described methods. The methods will be explained with reference to one or more logical volumes in a storage system, but the methods need not be limited to logical volumes. The methods are equally applicable to storage systems that map to physical storage, rather than logical storage.

Figure 1:
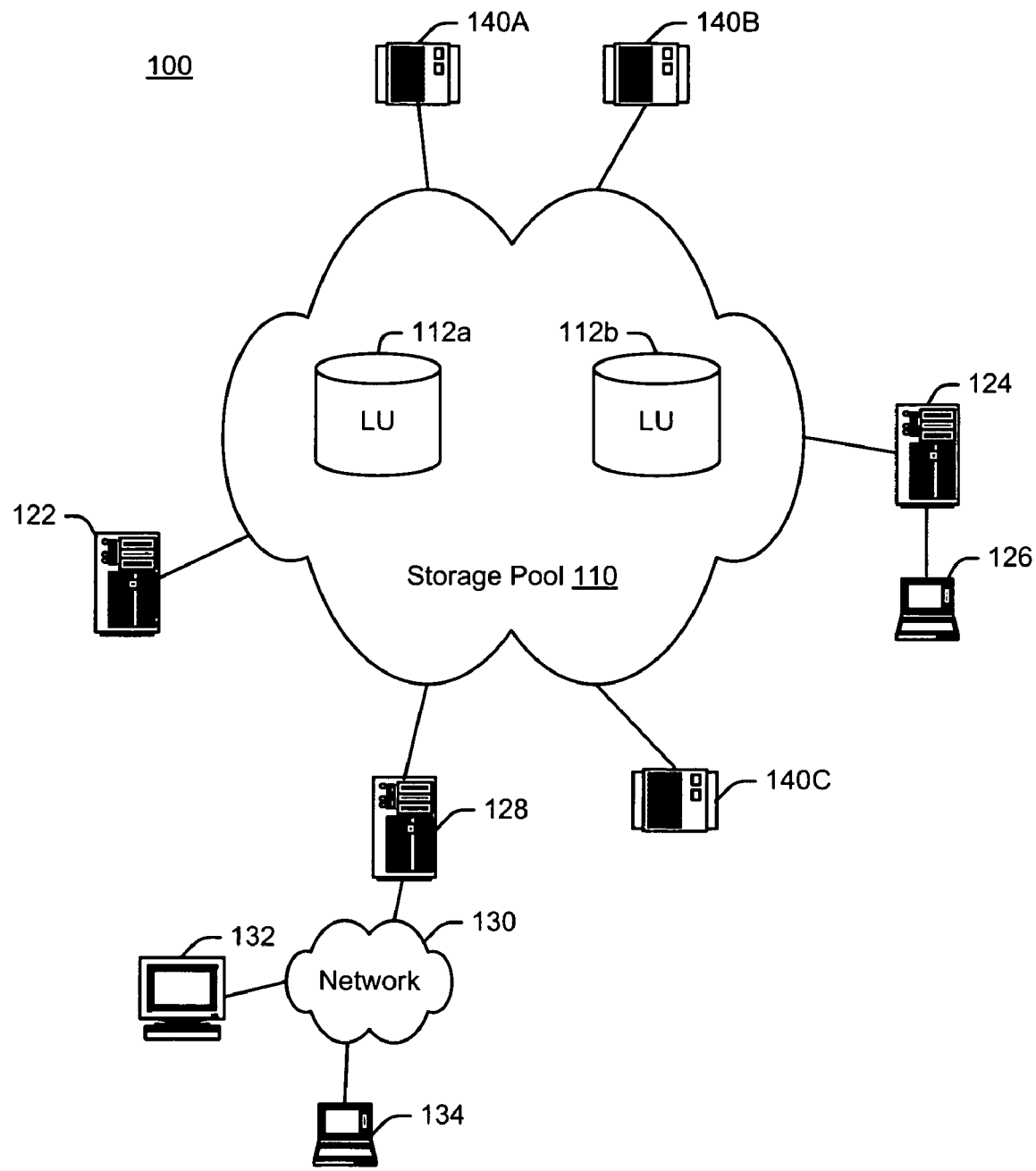
FIG. 1 is a schematic illustration of one embodiment of a storage network environment.

FIG. 1 is a schematic illustration of an exemplary implementation of a networked computing environment 100. Referring to FIG. 1, computing environment 100 includes a storage pool 110 that provides data storage services to one or more computing devices. Storage pool 110 may be implemented in one or more networked storage cells 140A, 140B, 140C. Exemplary storage cells include the STORAGEWORKS line of storage devices commercially available from Hewlett-Packard Corporation of Palo Alto, Calif., USA. Storage cells 140A, 140B, 140C may be co-located or may be geographically distributed, and may be connected by a suitable communication network. The communication network may be embodied as a private, dedicated network such as, e.g., a Fibre Channel (FC) switching fabric. Alternatively, portions of communication network may be implemented using public communication networks pursuant to a suitable communication protocol such as, e.g., the Internet Small Computer Serial Interface (iSCSI) protocol. The number of storage cells 140A, 140B, 140C that can be included in any storage network is limited primarily by the connectivity implemented in the communication network. For example, a switching fabric comprising a single FC switch can interconnect 256 or more ports, providing a possibility of hundreds of storage cells in a single storage network.

Computing environment 100 further includes one or more host computing devices which utilize storage services provided by the storage pool 110 on their own behalf or on behalf of other client computing or data processing systems or devices. Client computing devices such as client 126 access storage the storage pool 110 embodied by storage cells 140A, 140B, 140C through a host computer. For example, client computer 126 may access storage pool 110 via a host such as server 124. Server 124 may provide file services to client 126, and may provide other services such as transaction processing services, email services, etc. Host computer 122 may also utilize storage services provided by storage pool 110 on its own behalf. Clients such as clients 132, 134 may be connected to host computer 128 directly, or via a network 130 such as a Local Area Network (LAN) or a Wide Area Network (WAN).

Figure 2:
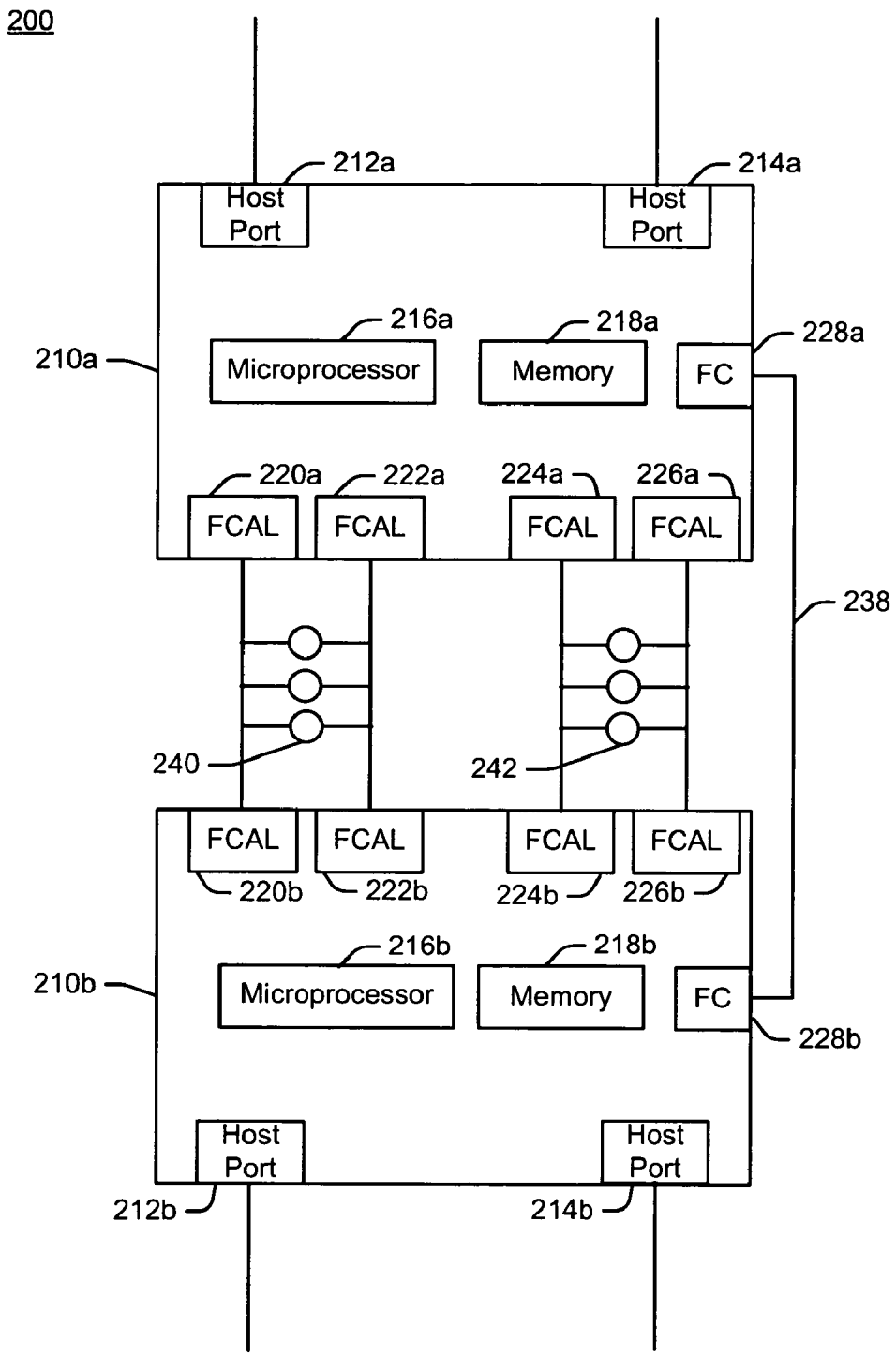
FIG. 2 is a schematic illustration of one embodiment of an array controller.

FIG. 2 is a schematic illustration of an exemplary embodiment of a storage cell 200. Storage cell 200 may correspond to one of the storage cells 140A, 140B, 140C depicted in FIG. 1. It will be appreciated that the storage cell 200 depicted in FIG. 2 is merely one exemplary embodiment, which is provided for purposes of explanation.

Referring to FIG. 2, storage cell 200 includes two Network Storage Controllers (NSCs), also referred to as "disk array controllers" or just "array controllers" 210a, 210b to manage operations and the transfer of data to and from one or more sets of disk drives 240, 242. Array controllers 210a, 210b may be implemented as plug-in cards having a microprocessor 216a, 216b, and memory 218a, 218b. Each array controller 210a, 210b includes dual host adapter ports 212a, 214a, 212b, 214b that provide an interface to a host, i.e., through a communication network such as a switching fabric. In a Fibre Channel implementation, host adapter ports 212a, 212b, 214a, 214b may be implemented as FC N_Ports. Each host adapter port 212a, 212b, 214a, 214b manages the login and interface with a switching fabric, and is assigned a fabric-unique port ID in the login process. The architecture illustrated in FIG. 2 provides a fully-redundant storage cell. This redundancy is entirely optional; only a single array controller is required to implement a storage cell.

Each array controller 210a, 210b further includes a communication port 228a, 228b that enables a communication connection 238 between the array controllers 210a, 210b. The communication connection 238 may be implemented as a FC point-to-point connection, or pursuant to any other suitable communication protocol.

In an exemplary implementation, array controllers 210a, 210b further include a plurality of Fiber Channel Arbitrated Loop (FCAL) ports 220a-226a, 220b-226b that implements an FCAL communication connection with a plurality of storage devices, e.g., sets of disk drives 240, 242. While the illustrated embodiment implement FCAL connections with the sets of disk drives 240, 242, it will be understood that the communication connection with sets of disk drives 240, 242 may be implemented using other communication protocols. For example, rather than an FCAL configuration, a FC switching fabric may be used.

In operation, the storage capacity provided by the sets of disk drives 240, 242 may be added to the storage pool 110. When an application requires storage capacity, logic instructions on a host computer such as host computer 128 establish a LUN from storage capacity available on the sets of disk drives 240, 242 available in one or more storage sites. It will be appreciated that, because a LUN is a logical unit, not a physical unit, the physical storage space that constitutes the LUN may be distributed across multiple storage cells. Data for the application may be stored on one or more LUNs in the storage network. An application that needs to access the data queries a host computer, which retrieves the data from the LUN and forwards the data to the application.

Figure 3:
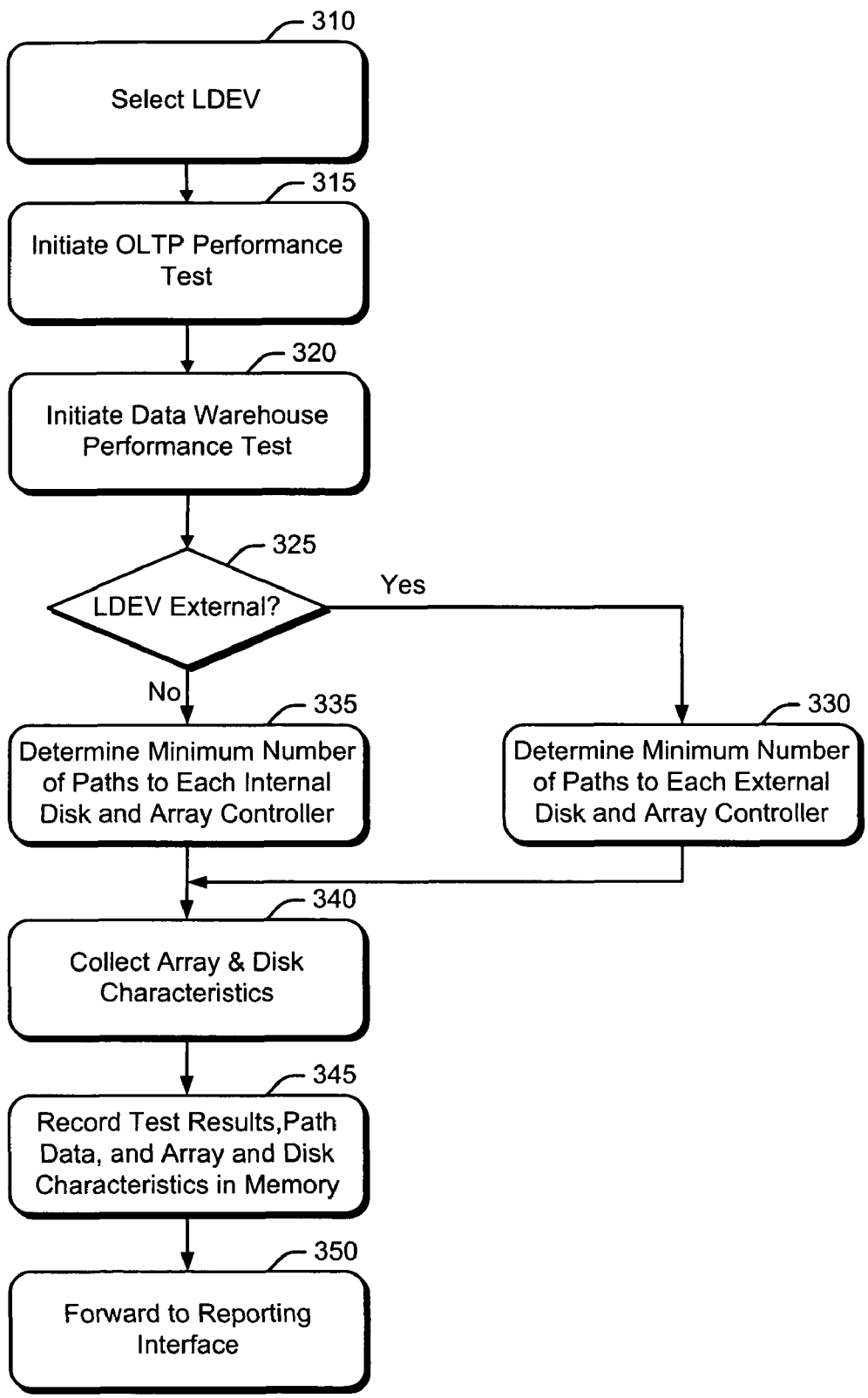
FIG. 3 is a flowchart illustrating operations in one embodiment of a method for intelligent logical unit provisioning

In operation, a user, administrator, or software module responsible for managing the storage pool 110 may periodically need to provision a new logical unit, such as logical unit 112a, 112b, in the storage pool 110. FIG. 3 is a flowchart illustrating operations in one embodiment of a method for intelligent logical unit provisioning, and FIG. 4 is a schematic illustration of one embodiment of a user interface for intelligent logical unit provisioning. The operations of FIG. 3 may be implemented in a storage controller such as one of the storage controllers 210a, 210b to enable the storage controller to collect performance data and availability data from internal logical units (i.e., logical units defined from physical storage media within the storage cell) and external logical units (i.e., logical units defined from physical storage media outside the storage cell. Once collected, the performance data and availability data may be presented to a reporting interface, which may organize the data and present the data in a suitable interface.

Referring to FIG. 3, at operation 310 a logical device is selected. In one embodiment, a logical device may correspond to a logical unit such as logical units 112a, 112b, managed by the storage controller. At operation 315 a performance test is initiated on the logical device selected in operation 310. In one embodiment, the storage controller initiates an online transaction performance (OLTP) test in which 8 KB blocks of data are written to and read from the logical unit for a predetermined time period such as, e.g., 250 ms. In one embodiment, the performance test implements a 60:40 ratio of read operations to write operations, although other ratios may be implemented. One technique for estimating the performance of an OLTP application may be accomplished by subjecting a storage unit to a workload including the following attributes: Block-size: 8 kB, access pattern: Random, read percentage 60%, write percentage: 40%, queue depth: 1 to n, where in causes an average response time of 30 ms. The general metric of concern is the maximum number of input/output operations per second (IO/sec) that the storage unit can support. This information permits proper matching of application users and storage resources to maintain an acceptable performance experience for the application. One technique for measuring such performance, may include supplying the storage with a predetermined workload for a defined amount of time. The performance rate may be calculated by dividing the number of I/O operations completed by the time (e.g., in seconds) to give a result in units of I/O operations per second.

At operation 320 a data warehouse test is initiated on the logical device selected in operation 310. In one embodiment, the storage controller initiates a simulated data warehouse workload test in which 64 KB blocks of data are read sequentially from the logical unit for a predetermined time period such as, e.g., 250 ms. In alternate embodiments, different data block sizes may be read. One technique for estimating the performance of a data warehouse application may be accomplished by subjecting a storage unit to a workload consisting of the following attributes: Block-size: 64 KB, access pattern: Sequential, read percentage 100%, queue depth: 1 to n (where in causes an limited increase in MB/sec throughput as compared to n-1). A point of interest is to determine a maximum MB/sec that a configuration can sustain. Knowing these limits allows for successful sizing of the storage resources to be able to meet the high throughput demands from the application. In one embodiment, a performance rate may be calculated by the following formula: MB/sec=(((C*B))/1000000)/s, where C is defined as the number of I/O operations completed, B is defined as the Block Size of each I.O in bytes, and s is defined as the duration of the measurement time in seconds.

If, at operation 325, the LDEV selected in operation 310 is an external LDEV, then control passes to operation 330, and the minimum number of paths to each external disk in the LDEV and to the array controller managing the LDEV is determined. This number is relevant in that a value of less than two represents storage which would not be considered as highly available. This number may be entered into the data table by the user at the time of external storage configuration. In one embodiment, a criteria for high availability is that no single point of failure causes data in the storage system to be inaccessible. So, a goal for a high availability configuration is to allow a user to have access to data stored in the storage product. Although a storage unit may be accessed through different paths, it is common that only a single path will be utilized at any particular point in time. One goal for high availability is not usually associated with general performance and has a different type of testing techniques which often includes such things as: 1) interface cable failures, 2) servers to be power-cycled during operation, and 3) disks failure. These types of failures are easily accomplished by physically removing an interface cable or disk and by turning off a server during a data integrity test. The testing philosophy for validating a high availability solution may focus on data integrity, where data is written and later read and checked to see if the retrieved data matches that which has been previously written. Storage performance, during this type of test, may not be related to a pass or fail criteria because the computer doing the test may be busy doing other tasks other than strict IO performance on the storage.

By contrast, if at operation 325 the LDEV selected in operation 310 is an internal LDEV, then control passes to operation 335 and the minimum number of paths to each internal disk and array controller is determined. For example, in the embodiment depicted in FIG. 2, there are two paths to each disk and to the array controllers that manage the LDEVs. The industry default for all internal disks would tend to be two paths, to provide redundancy. By contrast the number of paths to external storage can vary widely.

At operation 340 characteristics of the array controller managing and the disk array housing the LDEV selected in operation 310 are collected. In one embodiment, the storage controller determines the RAID level implemented in the LDEV, the RAID group with which the LDEV is associated, the size of the LDEV, and the size and type of the disk(s) housing the LDEV. In one embodiment, the storage controller maintains these characteristics in a data table established when LDEV is created. In this embodiment, the storage controller can retrieve these characteristics from the data table.

At operation 345 the results of the OLTP test initiated in operation 315 and the data warehouse test initiated in operation 320, the path information collected in operations 330, 335, and the characteristics collected in operation 345 are recorded in a suitable memory module. In one embodiment, the information collected in FIG. 3 may be stored in a memory table such as the memory table 400 depicted in FIG. 4. Referring to FIG. 4, the data table 400 includes a column 405 that includes an identifier for the LDEV, a column 410 that identifies the RAID type associated with the LDEV, a column 415 that identifies the RAID group with which the LDEV is associated, a column 420 that identifies the size of the LDEV, a column 425 that identifies the disk type and size, a column 430 that identifies whether the LDEV is internal or external, a column 435 that includes the results of the OLTP performance test, a column 440 that includes the results of the data warehouse test, a column 445 that includes the minimum number of physical paths to the disks, and a column 450 that includes the minimum number of physical paths to the controller.

Referring back to FIG. 3, at operation 350 the information in the memory table 400 may be forwarded to a reporting interface. In one embodiment, the reporting interface may include a user interface that presents the information to a user, e.g., on a suitable display. The user interface may further include logic instruction that permit a user to sort the data using one or more columns as a key. A user such as, e.g., a network administrator, may consult this information to make an informed judgment about which disk group(s) are good selections for provisioning a new LDEV as a host viewable logical unit (LU). Alternatively, the information in memory table 400 may be input to a software module that provisions LDEVs as host viewable LUs.

Reference in the specification to "one embodiment" or "an embodiment" means that a particular feature, structure, or characteristic described in connection with the embodiment is included in at least an implementation. The appearances of the phrase "in one embodiment" in various places in the specification are not necessarily all referring to the same embodiment.

Thus, although embodiments have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. A method, comprising:
   collecting, in a storage controller, performance data and availability data for a plurality of logical devices (LDEVS) managed by the storage controller, wherein the availability data is based, at least in part, on a number of communication paths to each of the plurality of logical devices; and
   presenting the performance data and availability data to a reporting interface.

2. The method of claim 1, further comprising using the performance data and the availability data to select a LDEV to provision as a host viewable LU.

3. The method of claim 1, wherein performance data and availability data are collected on a periodic basis.

4. The method of claim 1, wherein the performance data comprises at least one of results from an online transaction performance (OLTP) test or results from a data warehouse workload test.

5. The method of claim 1, wherein the availability data comprises at least one of:
   a minimum number of physical paths to an external storage volume;
   a minimum number of paths per external controller;
   an array identifier; or
   a disk drive characteristic.

6. The method of claim 1, wherein the availability data comprises at least one of: a disk drive characteristic; or a disk controller characteristic.

7. The method of claim 1, further comprising using the performance data and the availability data as keys in a sorting routine implemented in the reporting interface.

8. The method of claim 1, wherein the performance data comprises at least one of results from a performance test in which a predetermined number of blocks are written to and read from a logical device in a predetermined time period.

9. A storage controller, comprising:
   a first I/O port that provides an interface to a host computer;
   a second I/O port that provides an interface a storage device; and
   means for collecting performance data and availability data for a plurality of logical devices (LDEVS) managed by the storage controller before assigning a logical unit number to a logical device, wherein the availability data is based, at least in part, on a number of communication paths to each of the plurality of logical devices.

10. The storage controller of claim 9, further comprising means for presenting the performance data and availability data to a reporting interface.

11. The storage controller of claim 9, further comprising means for using the performance data and the availability data to select a LDEV to provision as a host viewable LU.

12. The storage controller of claim 9, wherein the performance data comprises at least one of results from an online transaction performance (OLTP) test or results from a data warehouse workload test.

13. The storage controller of claim 9, wherein the availability data comprises at least one of:
   a minimum number of physical paths to an external storage volume;
   a minimum number of paths per external controller;
   an array identifier; or
   a disk drive characteristic.

14. The storage controller of claim 9, wherein the availability data comprises at least one of:
   a disk drive characteristic; or
   a disk controller characteristic.

15. The storage controller of claim 9, wherein the performance data comprises at least one of results from a performance test in which a predetermined number of blocks are written to and read from a logical device in a predetermined time period.

16. A storage controller, comprising:
- a first I/O port that provides an interface to a host computer;
- a second I/O port that provides an interface a storage device;
- a processor that receives I/O requests generated by the host computer and, in response to the I/O requests, generates and transmits I/O requests to the storage device; and
- a memory module communicatively connected to the processor and comprising logic instructions which, when executed by the processor, configure the processor to:
  - collect performance data and availability data for a plurality of logical devices (LDEVS) managed by the storage controller; and
  - present the performance data and availability data to a reporting interface, wherein the availability data is based, at least in part, on a number of communication paths to each of the plurality of logical devices.

17. The storage controller of claim 16, further comprising using the performance data and the availability data to select a LDEV to provision as a host viewable LU.

18. The storage controller of claim 16, wherein performance data and availability data are collected on a periodic basis.

19. The storage controller of claim 16, wherein the performance data comprises at least one of results from an online transaction performance (OLTP) test or results from a data warehouse workload test.

20. The storage controller of claim 16, wherein the availability data comprises at least one of:
- a minimum number of physical paths to an external storage volume;
- a minimum number of paths per external controller;
- an array identifier; or
- a disk drive characteristic.

21. The storage controller of claim 16, wherein the availability data comprises at least one of:
- a disk drive characteristic; or
- a disk controller characteristic.

22. The storage controller of claim 16, further comprising logic instructions which, when executed by the processor, configure the processor to use the performance data and the availability data as keys in a sorting routine implemented in the reporting interface.

23. The storage controller of claim 16, wherein the performance data comprises at least one of results from a performance test in which a predetermined number of blocks are written to and read from a logical device in a predetermined time period.

24. A computer program product comprising logic instructions stored on a computer-readable medium which, when executed by a processor, configure the processor to:
- collect performance data and availability data for a plurality of logical devices (LDEVS) managed by a storage controller before assigning a logical unit number to a logical device, wherein the availability data is based, at least in part, on a number of communication paths to each of the plurality of logical devices; and
- use the performance data and availability data to allocate a resources to provision a logical unit.

25. The computer program product of claim 24, further comprising using the performance data and the availability data to select a LDEV to provision as a host viewable LU.

26. The computer program product of claim 24, wherein performance data and availability data are collected on a periodic basis.

27. The computer program product of claim 24, wherein the performance data comprises at least one of results from an online transaction performance (OLTP) test or results from a data warehouse workload test.

28. The computer program product of claim 24, wherein the availability data comprises at least one of:
- a minimum number of physical paths to an external storage volume;
- a minimum number of paths per external controller; an array identifier; or
- a disk drive characteristic.

29. The computer program product of claim 24, wherein the availability data comprises at least one of: a disk drive characteristic; or a disk controller characteristic.

30. The computer program product of claim 24, further comprising logic instructions which, when executed by the processor, configure the processor to use the performance data and the availability data as keys in a sorting routine implemented in the reporting interface.

31. The computer program product of claim 24, wherein the performance data comprises at least one of results from a performance test in which a predetermined number of blocks are written to and read from a logical device in a predetermined time period.

* * * * *

UNITED STATES PATENT AND TRADEMARK OFFICE
CERTIFICATE OF CORRECTION

PATENT NO. : 7,721,053 B2  Page 1 of 1
APPLICATION NO. : 11/256912
DATED : May 18, 2010
INVENTOR(S) : Robert A. Cochran et al.

It is certified that error appears in the above-identified patent and that said Letters Patent is hereby corrected as shown below:

In column 8, lines 29-30, in Claim 28, delete
"a minimum number of paths per external controller; an array identifier; or" and
insert -- a minimum number of paths per external controller;
    an array identifier; or --, therefor.

Signed and Sealed this

Thirtieth Day of November, 2010

David J. Kappos
*Director of the United States Patent and Trademark Office*